United States Patent [19]

Caithamer et al.

[11] 3,829,617

[45] Aug. 13, 1974

[54] CENTRAL AUTOMATIC MESSAGE ACCOUNTING SYSTEM

[75] Inventors: George J. Caithamer, Brookfield; Ivan V. Coleman, Naperville; David K. K. Lee, Chicago, all of Ill.

[73] Assignee: GTE Automatic Electric Laboratories, Incorporated, Northlake, Ill.

[22] Filed: Sept. 1, 1972

[21] Appl. No.: 285,777

[52] U.S. Cl. .............................................. 179/7.1 R
[51] Int. Cl. .......................................... H04m 15/10
[58] Field of Search ............ 179/7.1 TP, 7.1 R, 7 R, 179/27 FF

[56] References Cited

UNITED STATES PATENTS

| | | | |
|---|---|---|---|
| 3,122,611 | 2/1964 | Wheeler | 179/7.1 R |
| 3,453,389 | 7/1969 | Shaer | 179/7.1 R |
| 3,484,560 | 12/1969 | Jaeger, Jr. et al. | 179/27 FF |
| 3,560,658 | 2/1971 | Molloy et al. | 179/7.1 TP |
| 3,651,269 | 3/1972 | Le Strat et al. | 179/7.1 R |

*Primary Examiner*—Kathleen H. Claffy
*Assistant Examiner*—Gerald L. Brigance

[57] ABSTRACT

Data on telephonic toll communications are recorded in an automatic toll recording office by means of computers and magnetic tape machines instead of by ticketing in the several originating exchanges. Service junctors are inserted into the path from the originating exchange to the toll switching exchange. These service junctors are monitored for calls, and upon the initiation of a call are connected to a data receiver. A memory area is allotted to the receiver and the initial data on an originating call is placed therein. A processor screens the data, controls the re-sending of the digits to the toll office and stores the information in a billing unit buffer memory. The service junctor is scanned for the duration of the call via a separate path and upon termination of the call another entry is made in the buffer memory. As the buffer memory reaches a predetermined amount of data it is periodically dumped onto the tape.

1 Claim, 1 Drawing Figure

PATENTED AUG 13 1974 3,829,617
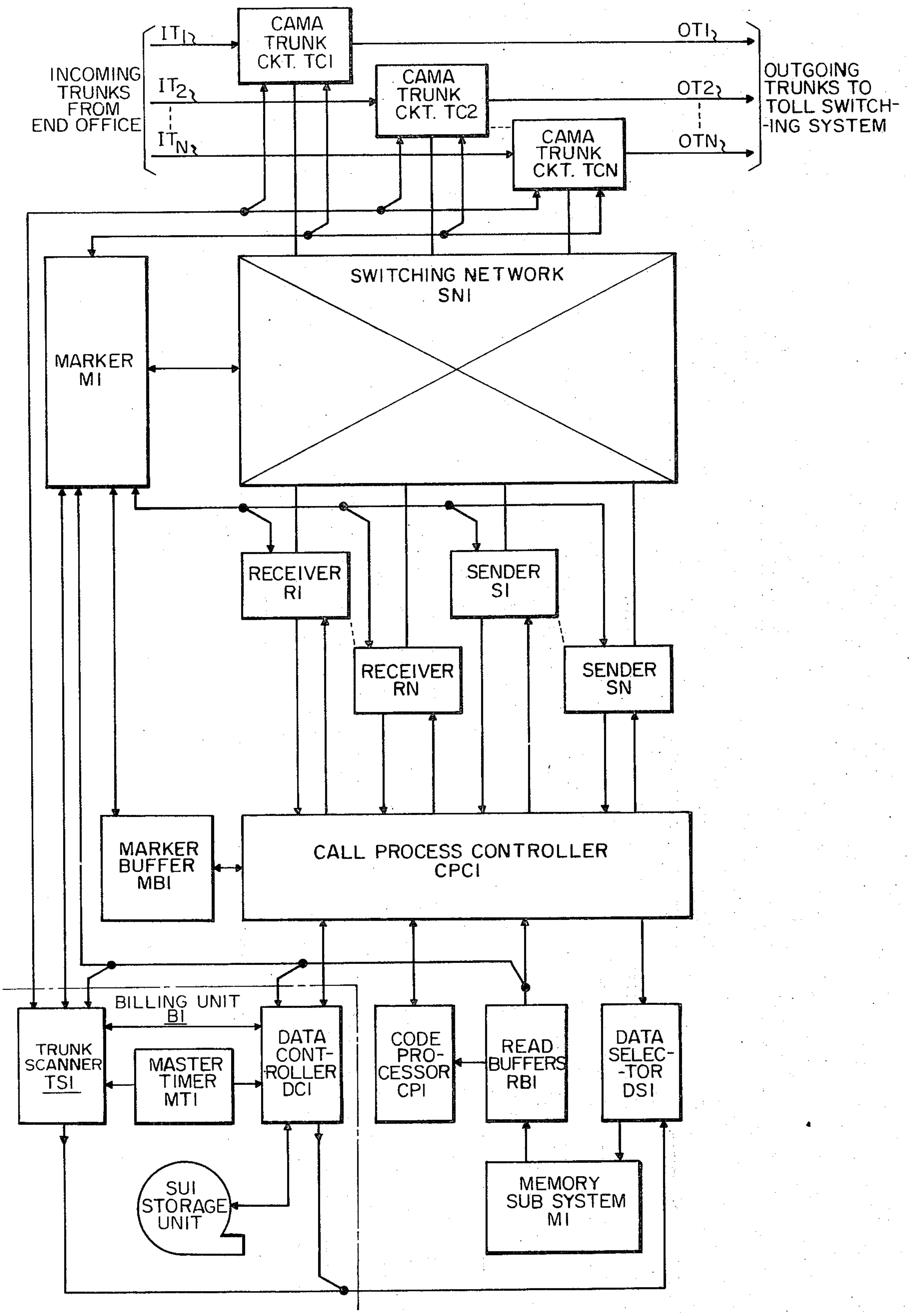

CENTRAL AUTOMATIC MESSAGE ACCOUNTING SYSTEM

BACKGROUND OF THE INVENTION

1. Field of the Invention

The present invention relates to a recording system designed for accounting telecommunications, more particularly for a plurality of automatic telephone exchanges. It is specifically designed for accounting the variable charges which are used in toll communications.

2. Description of the Prior Art

One of the well known methods of charging used in small exchanges is to record the number of charge units, due for local communications, on meters which are allotted to the subscribers of the exchange, and to have tickets delivered by operators for toll communications. However in case the toll communications are automatic, it is necessary to provide for an automatic recording of the variable charges due for such communication. Thus, an automatic recording of the toll charges, as a multiple of said charge units, on the same meters, has been resorted to. This mode of charging suppresses every incident intelligence (day, hour, called location, etc.) which was entered by the operators on the tickets so that the administration can no longer give a detailed account of the bills it sends to the subscribers. This disadvantage of charging on meters lead to a "recorded charging," which comprises the recording of all useful intelligence regarding the communications, on a common carrier in a business machine, and then suitably analyzing the record.

One such system for the automatic recording of the call data is that developed by J. E. Ostline disclosed in U.S. Pat. No. 2,581,287 wherein, an idle primary register is associated with a calling line as soon as a call is initiated. In response to the dialing of the called zone and called exchange digits, indicative of a call to a nearby toll zone, a primary register in the exchange will register these dialed digits and will then cause an idle register translator to be associated with the primary register. The remaining digits of the called subscriber number, dialed by the calling subscriber, will be registered in the register translator and the primary register will transfer the digits registered therein to the register translator. In this manner all of the digits dialed by the calling subscriber will be registered in the register translator if the primary register determines that the call is to be completed under control of the register translator. The register translator will then transmit switch setting impulses corresponding either to the value of the digits registered therein or to a translation of a certain portion of the registered digits, followed by impulses corresponding to the value of the remaining registered digits depending upon the routing path over which the connection is to be completed to the called exchange. A translation is usually made of the first three digits registered in a register translator whereby one or more routing digits may be transmitted by the register translator for the purpose of setting up the connection. Facilities are also provided in the register translator for transmitting, as registered, one or more of the first three registered digits and each of the four remaining registered digits of the called subscriber number. As a further result of the association of an idle register translator with the primary register, a detector is associated with the register translator. The detector proceeds to identify the four digits identifying the terminal number of the calling subscriber line and registers these digits in the register translator.

During the setting up of a connection to the called subscriber line under the control of the register translator, an idle toll ticket repeater will be selected and included in the connection for the purpose of registering and storing various items of record information which are temporarily registered in the register translator. The inclusion of a toll ticket repeater in a connection will signal the register translator and thus cause the register translator to transmit to the toll ticket repeater, in code form, the various items of information registered therein including the calling subscriber number, the called office code digits, the called subscriber number, the class of service, the rate, and the identity of the register translator involved in the connection. As soon as a connection is completed between the calling and the called subscribers, the toll ticket repeater will time the call and in response to the release of the connection, the toll ticket repeater will have registered therein the abovementioned items of information plus the duration of the call. Following the release of the connection, the toll ticket repeater will cause an idler printer controller to be associated therewith and it will transfer all of the items of information as noted above, including the identity of the toll ticketing repeater to the associated printer controller.

Another system having a different approach to this same problem is that disclosed in U.S. Pat. No. 2,688,658 issued to W. W. Carpenter and R. E. Collis for use in offices that employ equipment of the crossbar type. The apparatus utilized for making these records includes, besides the switches and common control equipment for extending the lines, a recorder or perforator, a recorder controller commonly known as a transverter, a call identity indexer which identifies the number assigned to the trunk over which the connection is extended from the originating office, and a master timer which, in a sense, is also a recorder controller since it controls the operation of the recorder in producing certain items of record information for the benefit of the accounting office and for certain other purposes. The recorder, under the control of the transverter acting in response to the calling and called line number and certain other information supplied by the sender, records on a continuous recording medium three so-called entries for each call; namely, an initial entry when the common equipment is establishing the connection, an answer entry when the called subscriber answers the call, and a disconnect entry when the connection is terminated. Inasmuch as the recorder is used in common by a plurality of trunks, it is connected to a trunk (and to the transverter for the initial entry) only for the time required to record each of the three entries pertaining to a call. The result is that while the three entries for one call are placed on the record in the chronological order of their production, they are interspersed among similar entries produced for other calls established over the other trunks served by the same recorder.

These and other piror systems for automatically collecting and printing the items of information, in order to obviate the need for the large number of toll operators, are capable of accomplishing this result only by the use of large amounts of electromagnetically operated switching, registering, and printing equipment. This equipment, in addition to being relatively slow in operation so as to unduly increase the holding time of the toll trunks, is costly to build, install and maintain, and occupies an excessive amount of floor and rack space in the exchange offices. Some of these prior systems produce a printed ticket having the desired information thereon immediately following the termination of the toll call to which the information pertains and thereby require a large amount of printing equipment in order to provide adequate service during the period of the day when the toll traffic is the heaviest.

SUMMARY OF THE INVENTION

Accordingly, it is an object of the present invention to provide an improved system independent of the switching exchanges for recording the data for toll communications via particular communication trunks, so that a centralized recording of the usage of these trunks is achieved for all subscribers of the network served.

According to a feature of the invention this is achieved by monitoring the trunks between the end offices and the toll switching office.

When the trunk circuit recognizes the call-for-service for the originating office, it will initiate a call-for-service to the marker. The marker, upon detection of a call-for-service, will identify the trunk that is requesting service. Identification will result in an assignment of a unique identity number and the location of an idle receiver. Having uniquely identified the trunk and receiver, the marker makes the connection through the matrix and requests the marker buffer for service. The marker buffer now scans the memory for an idle call store. Detection of an idle call store will cause the equipment and receiver identities to be dumped into the call store's memory, the call process controller's sequence state updated to busy, and the marker buffer reset to idle. The code processor is now requested and class mark information is obtained about the particular equipment identity and stored in the call store memory. At this time, the call process controller will instruct the receiver to remove delay dial and the system is now ready to receive digits.

Upon receipt of a digit by the receiver, it is presented to the call processor for storage in the call store memory. After receipt of ST, the call process controller will inform the receiver to instruct the trunk circuit to return an off-hook to the calling office. If the call is an ANI call, the call processor will receive, accumulate, and store the calling number in the same manner as the called number. After the call process controller receives ST, it will initiate a request for the code processor. The code processor utilizing the called and calling numbers will check for EAS Blocking, and other functions. Upon completion of the analysis, the code processor will send back to the call process controller information to route the call to an announcement or tone trunk, add prefix digits, or provide delete information pertinent to the called number.

At this time, the call process controller will request the billing unit for storage of an initial entry in the billing unit memory, and will simultaneously inform the receiver to drop the trunk to receiver connection, but to remain busy to the marker. The call process controller now initiates a request to the marker buffer for a trunk-to-sender connection. Once the marker has made the trunk-to-sender connection and has transferred the identities to the marker buffer, the marker buffer will dump this information into the appropriate call store memory and the call process controller will release the receiver to true idle. The call process controller now interrogates the sender for information that delay dial has been removed by the routing switch. Upon receipt of this information the call processor will initiate the sending of digits.

The initial entry information when dumped from the call store memory is arranged in initial entry format and stored in the billing unit's memory. Eventually, the call's answer and disconnect entries will also be stored in the billing unit memory. These entries will be stored in the billing unit memory until a sufficient number have been accumulated to comprise one data block. Once the billing unit memory is filled, the tape unit is called and the contents of the billing unit memory is recorded onto the magnetic tape.

The trunk scanner maintains an up-to-date status of all the trunks on a continuous basis. For each "initial" entry, normally, two trunk scanner entries are required. When the call reaches its destination and the call subscriber goes off-hook, the answer condition is repeated back to the trunk. The scanner senses the answer condition, and has the "answer" entry placed on the tape. Upon completion of the call the scanner senses the "disconnect" entry and has the entry placed on the tape.

The end result on a valid call is a record of the billing information stored on magnetic tape in a multi-entry format.

BRIEF DESCRIPTION OF THE DRAWING

The invention will be described more particularly as applied in a toll switching network, with reference to the appended drawing, wherein the single FIGURE is a block diagram of a centralized automatic message data recording system according to the principles of this invention.

Method of Operation

This part describes the method of operation of a typical call.

When a trunk circuit such as TC1 of the group TC1–TCN recognizes the seizure from the originating office via the trunks IT1 through ITN, it will return an off-hook signal to the originating office and initiate a call-for-service to the marker M1. The marker M1 will check the equipment group and position scanners and identify the trunk that is requesting service. This identification will result in an assignment of a unique four digit 2 out of 5 coded equipment identity number. Through a trunk type determination, the marker determines the type of receiver of the group R1 through RN required and runs the receiver sender scanner to locate an idle receiver such as R1. Having uniquely identified the trunk DC1 and receiver R1, the marker M1 makes the connection through the three-stage matrix SN1 and requests the marker buffer MB1 for service. The marker M1 call-for-service is recognized by the marker buffer MB1 and the equipment and receiver identities are loaded into the receiver register of the marker buffer MB1. The marker buffer MB1 now scans the memory M1 for an idle call store area. Detection of an idle call store will cause the equipment and receiver identities to be dumped into the call store's memory. At this time, the call process controller CPC1 will instruct the receiver R1 to remove the delay dial indication to the end office and the system is now ready to receive digits.

Upon receipt of a digit, the receiver R1 decodes that digit into a 2 out of 5 code and times the duration of the digit presentation by the calling end. Once it is ascertained that the digit is valid, it is presented to the call process controller CPC1 for a duration of no less than 50 msec of digit and 50 msec of interdigital pause for storage in the call store memory area of its memory subsystem M1. After receipt of the ST signal, the call process controller CPC1 will control the receiver R1 to instruct the trunk circuit TC1 to again return an off-hook signal to the calling office, and it will request the service of the code processor CP1. The code processor CP1 utilizes the called number to check for extended area service blocking and other functions. Upon completion of the analysis, the code processor CP1 will send to the call process controller CPC1 information to route the call to an announcement or tone trunk, add prefix digits, or provide delete information pertinent to the called number. If the call process controller CPC1 determines that the call is a call from an office having automatic calling number identification, it will receive, accumulate and store the calling number in the same manner as was done with the called number. After the call process controller receives the ST signal it will request the billing unit for storage of an initial entry in the billing unit memory. It will also command the receiver R1 to drop the trunk-to-receiver connection. The call process controller CPC1 now initiates a request to the marker M1 via the marker buffer MB1 for a trunk-to-sender connection. Once the marker M1 has made the connection and has transferred the identities to the marker buffer, the marker buffer MB1 will dump this information into the appropriate call store memory. The call process controller CPC1 now interrogates the connected sender for example S1 for information that the delay dial signal has been removed by the tandem office routing switch. Upon receipt of this information the call process controller CPC1 will initiate the sending of digits, including the KP and ST signals. The call process controller CPC1 will control the duration of tones and interdigital pause. After sending the ST signal, the call processor controller CPC1 will await the receipt of the matrix release signal from the sender S1. Receipt of this signal will indicate that the call has been cut-through and the trunk-to-sender connection has been dropped. At this time, the sender S1 and call store are returned to idle, ready to process a new call.

The initial entry information when dumped from the call store memory is organized into the proper format and stored in the billing unit's memory. Eventually, the call's answer and disconnect entries will also be stored in the billing unit memory. The initial entry will consist of approximately 40 characters, and trunk scanner TS1 entries for answer or disconnect contain approximately 20 characters. These entries will be temporarily stored in the billing unit memory until a sufficient number have been accumulated to compose one data block of 1,370 characters. Once the billing unit memory is filled, the tape unit is called and the contents of the billing unit memory is recorded on to the magnetic tape.

The final result on a valid call will be a permanent record of billing information stored on magnetic tape in multi-entry format consisting of initial, answer, and disconnect or forced disconnect entries.

Trunks

The trunks TC1–TCN are located in the transmission path between the end office at which the call originated and the toll switching office. They provide an interface for the marker, the local switching network and the billing unit to the communication switching system within which they are located. No reconfiguration of the transmission path is provided, a two- or a four-wire transmission path from the end office is sent as a two- or a four-wire transmission respectively to the toll switching office.

Network

The switching network SN1 consists of three stages of matrix switching equipment between the trunks TC1–TCN on the inlet side and the receivers R1–RN, the senders S1–SN on the outlet side of the network. A suitable distribution of links between matrices is provided to assure that every inlet has full access to every outlet of the network. The three stages, which consists of A, B, and C crosspoint matrices, are interconnected by AB and BC links. Each inlet extends into an A matrix and is defined by an inlet address. Each outlet extends from a C matrix to a terminal and is defined by an outlet address.

Network Unit

Each network is divided into 25 trunk grids on the inlet side of the network and a service grid with 16 arrays on the outlet side of the network. The trunk grids and the service grid within the networks are interconnected by the BC link sets of 16 links per set. Each trunk grid provides for 40 or 80 inlets depending upon the trunk type. The service grid provides for a maximum of 80 outlets. A BC link is the interconnection of an outlet of a B matrix in a trunk grid and an inlet of a C matrix in a service grid.

Trunk Grid

Each trunk grid provides for five A matrices and four B matrices interconnected by 20 AB links.

Each A matrix provides for eight or 16 inlets and four outlets or AB links. The outlets of an A matrix are connected to the inlets of all B matrices within the same trunk grid.

Each B matrix provides for five inlets or AB links and four outlets or BC links.

The service grid consists of 16 correed arrays with inlets from the B matrices of the trunk grids. Each array has an input from each trunk grid. Each of the trunk grid's 16 outputs goes to a different C stage array.

Marker

The marker M1 is the electronic control for establishing paths through the electromechanical switching network SN1. The marker constantly scans the trunks for a call-for-service. When the marker identifies a trunk with a call-for-service, it determines the trunk's type, and establishes a physical connection between the trunk and a proper receiver.

The trunk identity and type, along with the receiver identity are temporarily stored in a buffer MB1 which interfaces the marker M1 and call process controller CPC1.

When the call process controller CPC1 has stored all the information transmitted from a receiver, such as R1, it signals the marker M1 that a particular trunk requires a sender of the group S1–SN. The marker determines an available sender such as S1, establishes a physical connection from the trunk TC1 to the sender S1 and informs the call process controller CPC1 of the trunk and sender identities.

Receiver

The functions of the receiver are to receive data from the end office in multifrequency 2 out of 6 (MF 2/6) tones or DP signals, representing the called number and convert them to a coded output and present them to the call processor. The calling number is received by MF 2/6 only. It also accepts coded commands from the call processor.

Sender

The function of the MF sender is to accept coded commands from the call processor, convert them to multi-frequency 2 out of 6 tones and send them to the toll switch.

Call Process Controller

The purpose of the call process controller CPC1 is to provide call processing control in the system. In addition, it provides temporary storage of the called and calling telephone numbers, the identity of the trunk which is being used to handle the call, and other necessary information. This information forms part of the initial entry for billing purposes in a multi-entry system. Once this information is passed to the billing unit, where a complete initial entry is formated, the call will be forwarded to the toll switch for routing.

The call processor subsystem includes the marker buffer MB1. There are 77 call stores in the call processor, each call store can handle one call at a time. The call processor operates on these 77 call stores on a time shared basis. Each call store has a unique time slot, and the access time for all 77 call stores is equal to about 39.4ms.

Marker Buffer

The marker buffer MB1 is the electronic interface between the marker M1 and the call processor controller CPC1. Its primary functions are to receive from the marker M1 the identities of the trunk, receiver or sender, and the trunk type. This information is passed on to the appropriate call store memory.

Call Process Controller Memory

The operation of the call process controller CPC1 revolves around the call store's memory. The call store is a section of memory allocated for the processing of a call, and the call process controller CPC1 operates on the 77 call stores sequentially. Each call store's memory storage has eight rows and each row consists of 50 bits of information. The first and second row is repeated in two seven and eight, respectively. Each row consists of two physical memory words of 26 bits per word. Twenty-five bits of each word are used for storage of data, the 26th bit is a parity bit.

The first and second rows are considered control words, where sequence states, timing of events during all progress, results of data analysis, and command generation are recorded. A portion of the first and second rows is used to store the receiver and sender identities. The third row stores the trunk identity, part of the class mark and the prefix digits. The fourth row stores the calling number from ANI spill or from the ONI operator, the originating area code, the information digit, and part of the class mark. The fifth row stores the called number. The sixth row is spare.

The call process controller CPC1 makes use of the information stored in memory to control the progress of the call. It performs digit accumulation and the sequencing of digits to be sent. It performs fourth digit 0/1 blocking on a six or 10 digit call. It interfaces with the receivers R1–RN, senders S1–SN, code processor CP1, billing unit B1 and marker buffers MB1 to control the call.

Billing Unit

The billing unit B1 receives and organizes the call billing data, and transcribes it onto magnetic tape. A multi-entry tape format is used, and data is entered into tape via a tape transport operating in a continuous recording mode.

After the calling and called directory numbers, trunk identity and class of service information is checked and placed in storage, the billing unit B1 is accessed by the call process controller CPC1. At this time the call record information is transmitted to the billing unit B1 where it is formated and subsequently recorded on magnetic tape. The initial entry will include the time. Additional entries to the billing unit B1 are to record answer and disconnect information. The trunk scanner TS1 is the means of conveying the various states of the trunks TC1–TCN to the billing unit B1. It is connected to the trunks TC1–TCN by a highway extending from the billing unit B1 to each trunk. Potentials on the highway leads will indicate states in the trunks.

Each distinct entry (initial, answer, disconnect) will contain a unique entry identity code as an aid to the EDP (electronic data processing) equipment in consolidating the multi-entry call records into toll billing statements. The billing unit B1 will provide the correct entry identifier code.

Code Processor

The main purpose of the Code Processor CP1 is to analyze called destination codes to perform screening, prefixing and code conversion operations of a nature which are originating point dependent. This code processing is peculiar to the needs of DDD originating traffic and is not concerned with trunk selection and alternate routing, which are regular translation function of the associated toll switching machine. Originating point determination is made upon two bases: (1) trunk class mark, usually defining a specific tributary office, and (2) originating code analysis, an option controlled by trunk class mark. The latter permits a number of different classes such as WATS with various zone capabilities to be served along with regular DDD on a combined trunk group from the end office.

The code processor CP1 is accessed only by the call process controller CPC1 on a demand basis. The code processor CP1 will contain provisions for class-of-service determination; EAS blocking; determination of NPA; pretranslation of D.P. calls after three received digits to determine length of called code; WATS and IN-WATS zoning and code conversion, and prefixing which will generally be required only on calls generated from a foreign NPA to another office in that same FNPA.

In order that the EDP centers can identify the billing tapes and the CAMA system they come from, the billing equipment will place the label information on each tape. If problems arise with the tape unit and there is a transfer to another tape unit the billing equipment would provide the transfer label information for recording on the tape.

The billing unit B1 also contains the call record timing equipment. In addition to providing the required time increments used for call charging, the time equipment would provide the calendar information required in the label format.

The magnetic tape unit SU1 comprises the magnetic tape transport and the drive, storage, and control electronics required to read and write data from and to the nine channel billing tape. The read function will allow the tape unit to be used to update the memory.

The recorder operates in the continuous mode at a speed of 5 inches per second and a packing density of 800 bits per inch. Billing data will be recorded in a multi-entry format using a 9-bit EBCDIC character (Extended Binary Coded Decimal Interchange Code).

Memory Subsystem

The memory subsystem M1 serves as the temporary storage of the call record, as the permanent storage of code tables for the code processor CP1, and as the alterable storage of the trunk status used by the trunk scanner TS1.

The core memory is composed of ferrite cores as the storage elements, and electronic circuits used to energize and determine the status of the cores. The core memory is of the random access, destructive read-out type, 26 bits per word with 16 K words.

For storage, data is presented to the core memory data registers by the write transfer. The address generator provides the address or core storage locations which activate the proper read/write circuits representing one word. The proper clear/write command allows the data selected by the data selector to be transferred to the core storage registers for storage into the addressed core location.

For read-out, the address generator provides the address or core storage location of the word which is to read out. The proper read/restore command allows the data contained in the word being read out, to be presented to the read buffer. With a read/restore type of command, the data being read out is also returned to core memory for storage at its previous location.

We claim:

1. In a telephone system adapted for the automatic recording of items of information pertaining to toll connections, the combination of: a plurality of service trunk circuits each having a first end permanently connected to a corresponding outgoing trunk circuit at a call originating office and a second end permanently connected to a corresponding incoming trunk circuit at a terminating office, means responsive to the receipt of a call by any one of said service trunk circuits over said first end for extending said call via said second end, said means including a branch of said service trunk circuit, a process control means, a digital data receiver, a sender means, a memory means, and marker means additionally responsive to the receipt of said call for connecting said call via said branch to said digital data receivers, marker buffer means operated after said marker means to connect said marker means to said memory means, a code processor means thereafter operated to place a class mark in said memory means and enable said digital data receiver to receive data via said service trunk circuit branch, said code processor operated upon completed receipt of said data via said digital data receiver to provide routing data to said process control means, a billing means operated to serially record all data received, said process control means operated in response to said code processor to enable said marker means to connect said service trunk circuit branch to said sender means and to simultaneously make an initial entry in said billing means, said sender means operated to complete the sending of the required digital routing digits, and trunk scanning means thereafter operatively connected to said trunk circuit and responsive to an on-hook condition at either end for transmitting an independent entry of said condition to said billing means.

* * * * *